(12) United States Patent
Yang (10) Patent No.: US 10,391,690 B2
(45) Date of Patent: Aug. 27, 2019

(54) INJECTION MOLDING APPARATUS

(71) Applicant: Huawei Technologies Co., Ltd., Shenzhen (CN)

(72) Inventor: Guo Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/570,484

(22) PCT Filed: Apr. 30, 2015

(86) PCT No.: PCT/CN2015/077908
§ 371 (c)(1),
(2) Date: Oct. 30, 2017

(87) PCT Pub. No.: WO2016/172896
PCT Pub. Date: Nov. 3, 2016

(65) Prior Publication Data
US 2018/0141250 A1    May 24, 2018

(51) Int. Cl.
*B29C 45/27*     (2006.01)
*B29C 45/00*     (2006.01)
(Continued)

(52) U.S. Cl.
CPC ...... *B29C 45/2737* (2013.01); *B29C 45/0025* (2013.01); *B29C 45/26* (2013.01);
(Continued)

(58) Field of Classification Search
CPC ........ B29C 45/2642; B29C 2045/2743; B29C 2945/76752; B29C 2945/76759
See application file for complete search history.

(56) References Cited

U.S. PATENT DOCUMENTS 7,862,765 B2 *   1/2011   Hwang ............... B29C 45/0013
264/435

2003/0047842 A1 *   3/2003   Soulier ............... B29C 45/2701
264/449
(Continued)

FOREIGN PATENT DOCUMENTS

CN      1404437 A     3/2003
CN    102390103 A     3/2012
(Continued)

OTHER PUBLICATIONS

Xueshan et al.,"A Study on High-vacuum Electrostatic Reduced-gravity Apparatus," Journal of Instrumentation,vol. 21, No. 1, pp. 1-3 (Feb. 2000).
(Continued)

*Primary Examiner* — Joseph S Del Sole
*Assistant Examiner* — Emmanuel S Luk
(74) *Attorney, Agent, or Firm* — Leydig, Voit & Mayer, Ltd.

(57) ABSTRACT

The present disclosure provides an injection molding apparatus, including a fixed mold component, a movable mold component, a first positive electrode module, and a first negative electrode module. The fixed mold component has an injection port and a transmission runner, to receive injection-molding melt. The movable mold component has a molding groove communicated with the transmission runner. The first positive electrode module and the first negative electrode module are disposed on a first side and a second side of the molding groove respectively, where the first side and the second side are opposite to each other. The first positive electrode module cooperates with the first negative electrode module to form an electric field between the first side and the second side of the molding groove, to perform electric field excitation on the injection-molding melt flowing into the molding groove.

9 Claims, 4 Drawing Sheets

(51) Int. Cl.
*B29C 45/26* (2006.01)
*B29C 45/76* (2006.01)
*B29C 45/56* (2006.01)

(52) U.S. Cl.
CPC ...... *B29C 45/2602* (2013.01); *B29C 45/2642* (2013.01); *B29C 45/76* (2013.01); *B29C 45/561* (2013.01); *B29C 2045/2743* (2013.01); *B29C 2945/76752* (2013.01); *B29C 2945/76759* (2013.01); *B29C 2945/76859* (2013.01)

(56) References Cited

U.S. PATENT DOCUMENTS

| | | | | |
|---|---|---|---|---|
| 2013/0015178 A1* | 1/2013 | Lin | ......... | B29C 45/73 219/660 |
| 2013/0020740 A1* | 1/2013 | Jenko | ......... | B29C 45/2701 264/404 |
| 2013/0341837 A1* | 12/2013 | Gandhi | ......... | B29C 45/1701 264/437 |
| 2014/0191429 A1* | 7/2014 | Nakahashi | ......... | B29C 33/44 264/1.36 |
| 2017/0144346 A1* | 5/2017 | Kaiser | ......... | H02K 15/03 |

FOREIGN PATENT DOCUMENTS

| | | |
|---|---|---|
| CN | 102811847 A | 12/2012 |
| CN | 102873846 A | 1/2013 |
| CN | 103582549 A | 2/2014 |
| CN | 104167884 A | 11/2014 |
| DE | 102006014317 A1 | 9/2007 |
| JP | H0464419 A | 2/1992 |
| JP | 2005131841 A | 5/2005 |
| WO | 2011126735 A1 | 10/2011 |

OTHER PUBLICATIONS

Xue-Shan et al.,"Studies on the Micro-crystal Morphology of IPP Film Grown in a High Vacuum Strong Electrostatic Field." Journal of Shanghai University (Natural Science),vol. 6, No. 5, p. 468-472 (Oct. 2000).

* cited by examiner

INJECTION MOLDING APPARATUS

CROSS-REFERENCE TO RELATED APPLICATIONS

This application is a National Stage of International Application No. PCT/CN2015/077908, filed on Apr. 30, 2015, which is hereby incorporated by reference in its entirety.

TECHNICAL FIELD

The present disclosure relates to the field of product processing, and in particular, to an injection molding apparatus.

BACKGROUND

Injection molding is a molding method that combines injection and molding, and has advantages such as a fast production speed, high efficiency, automated operations, and an accurate artifact size. However, quality defects such as insufficient filling, warpage deformation, sink mark, and flow mark may usually occur in an injection molding process. At present, people have made great efforts in an injection molding technology, but problems still exist in quality performance of injection molded parts on which injection molding has been performed.

SUMMARY

A technical problem to be resolved in embodiments of the present disclosure is to provide an injection molding apparatus, so as to generate an electric field to perform excitation on injection-molding melt, thereby improving quality performance of an injection molded part.

According to a first aspect, an injection molding apparatus is provided, configured to receive injection-molding melt to solidify the injection-molding melt into an injection molded part, where the injection molding apparatus includes:

- a fixed mold component, where an injection port and a transmission runner connected with the injection port are formed in the fixed mold component, and the injection port is configured to be connected to a material injection apparatus, to receive the injection-molding melt injected by the material injection apparatus;
- a movable mold component, where the movable mold component cooperates with the fixed mold component to mold the injection molded part, a molding groove is formed on a top portion of the movable mold component, the molding groove runs through the top portion of the movable mold component, and is connected with the transmission runner, and the molding groove includes a first side and a second side that are provided opposite to each other;
- a first positive electrode module, where the first positive electrode module is located on the first side of the molding groove; and
- a first negative electrode module, where the first negative electrode module is located on the second side of the molding groove, to correspond to the first positive electrode module, so as to cooperate with the first positive electrode module to form an electric field between the first side and the second side of the molding groove, and further to perform electric field excitation on the injection-molding melt that flows into the molding groove through the transmission runner;

and at least one of the first positive electrode module or the first negative electrode module is insulated from the fixed mold component and the movable mold component.

In a first possible implementation manner of the first aspect, the first positive electrode module is disposed in the fixed mold component, the first side of the molding groove is a side that is of the molding groove and that is away from the movable mold component in a direction from the movable mold component to the fixed mold component, the first negative electrode module is the movable mold component, and the second side of the molding groove is a side that is of the molding groove and that is away from the fixed mold component in the direction from the movable mold component to the fixed mold component, where the movable mold component is grounded, so that a direction of the electric field formed between the first side and the second side of the molding groove is perpendicular to a flowing direction of the injection-molding melt that flows into the molding groove.

With reference to the first possible implementation manner of the first aspect, in a second possible implementation manner, the fixed mold component is provided with an accommodation groove, the accommodation groove runs through a bottom wall of the fixed mold component, and corresponds to the molding groove; and the injection molding apparatus further includes a first insulation structure and a second insulation structure, the first positive electrode module is accommodated in the accommodation groove, the first insulation structure is disposed between the first positive electrode module and an inner wall of the accommodation groove, to insulate the first positive electrode module from the fixed mold component, and the second insulation structure is disposed in the movable mold component, and encircles a peripheral wall of the molding groove, so that the peripheral wall of the molding groove is insulated from the movable mold component, to centralize electric field lines of the electric field in the molding groove.

With reference to the second possible implementation manner of the first aspect, in a third possible implementation manner, a bottom surface of the first positive electrode module is on a same plane as the bottom wall of the fixed mold component.

In a fourth possible implementation manner of the first aspect, the first positive electrode module and the first negative electrode module are both disposed in the movable mold component, the first side of the molding groove is a side from which the injection-molding melt flows into the molding groove, the second side of the molding groove is a side from which the injection-molding melt flows out of the molding groove, the first positive electrode module is provided with a first through groove, a first port of the first through groove is connected with the transmission runner, a second port of the first through groove is connected with a first port of the molding groove, so that the injection-molding melt flows into the molding groove through the transmission runner and the first through groove, and a direction of an electric field formed between the first positive electrode module and the first negative electrode module is parallel to a flowing direction of the injection-molding melt that flows into the molding groove.

With reference to the fourth possible implementation manner of the first aspect, in a fifth possible implementation manner, the first negative electrode module is provided with a second through groove, a first port of the second through groove is connected with the transmission runner, a second port of the second through groove is connected with a second port of the molding groove, so that the injection-molding melt flowing out of the transmission runner flows into the molding groove separately through the first through groove and the second through groove, and the injection-molding melt flowing into the molding groove has a weld line after being molded.

With reference to the fifth possible implementation manner of the first aspect, in a sixth possible implementation manner, the injection molding apparatus further includes a second positive electrode module and a second negative electrode module, where the second positive electrode module is disposed in the fixed mold component, and is located above the first positive electrode module, to form a positive electrode module group with the first positive electrode module, and the second negative electrode module is disposed in the fixed mold component, and is located above the first negative electrode module, to form a negative electrode module group with the first negative electrode module, where the second positive electrode module and the second negative electrode module are both insulated from the fixed mold component, and the positive electrode module group cooperates with the electrode module group, to form an electric field between the first side and the second side of the molding groove, and further to perform electric field excitation on the injection-molding melt flowing into the molding groove.

With reference to the sixth possible implementation manner of the first aspect, in a seventh possible implementation manner, the second positive electrode module is provided with a third through groove, a first port of the third through groove is connected with the transmission runner, a second port of the third through groove is connected with the first port of the molding groove, and the third through groove is connected with the first through groove; the second negative electrode module is provided with a fourth through groove, a first port of the fourth through groove is connected with the transmission runner, a second port of the fourth through groove is connected with the second end of the molding groove, and the fourth through groove is connected with the second through groove.

With reference to the sixth or the seventh possible implementation manner of the first aspect, in an eighth possible implementation manner, a shape of the first positive electrode module is the same as that of the second positive electrode module, a shape of the first negative electrode module is the same as that of the second negative electrode module, a projection of the first positive electrode module on the ground overlaps that of the second positive electrode module on the ground, and a projection of the first negative electrode module on the ground overlaps that of the second negative electrode module on the ground.

With reference to the fourth possible implementation manner of the first aspect, in a ninth possible implementation manner, a neck, with a minimum aperture, of the first through groove is an inlet of the first through groove, so that the injection-molding melt flows into the first through groove; and a neck, with a maximum aperture, of the first through groove is an outlet of the first through groove, to guide the injection-molding melt to the molding groove from the first through groove.

With reference to any one of the first to the ninth possible implementation manners of the first aspect, in a tenth possible implementation manner, the electric field between the first side and the second side of the molding groove is a strong electric field.

In the embodiments of the present disclosure, the injection molding apparatus includes the fixed mold component, the movable mold component, the first positive electrode module, and the first negative electrode module. An injection port and a transmission runner connected with the injection port are formed in the fixed mold component, and the injection port is configured to be connected to a material injection apparatus, to receive injection-molding melt injected by the material injection apparatus. The movable mold component cooperates with the fixed mold component to mold an injection molded part, a molding groove is formed on a top portion of the movable mold component, the molding groove runs through the top portion of the movable mold component, and is connected with the transmission runner; and the molding groove includes a first side and a second side that are provided opposite to each other. The first positive electrode module is located on the first side of the molding groove, and the first negative electrode module is located on the second side of the molding groove, to correspond to the first positive electrode module, so as to cooperate with the first positive electrode module to form an electric field between the first side and the second side of the molding groove, and further to perform electric field excitation on the injection-molding melt that flows into the molding groove through the transmission runner; and at least one of the first positive electrode module or the first negative electrode module is insulated from the fixed mold component and the movable mold component. Therefore, by means of the injection molding apparatus, an electric field is formed between the first side and the second side of the molding groove, to implement electric field excitation on injection-molding melt flowing into the molding groove, thereby forming a final injection molded part. By means of quality analysis for the injection molded part, a structure form and performance of the injection molded part are improved.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The following provides detailed descriptions separately by using specific embodiments.

Figure 1:
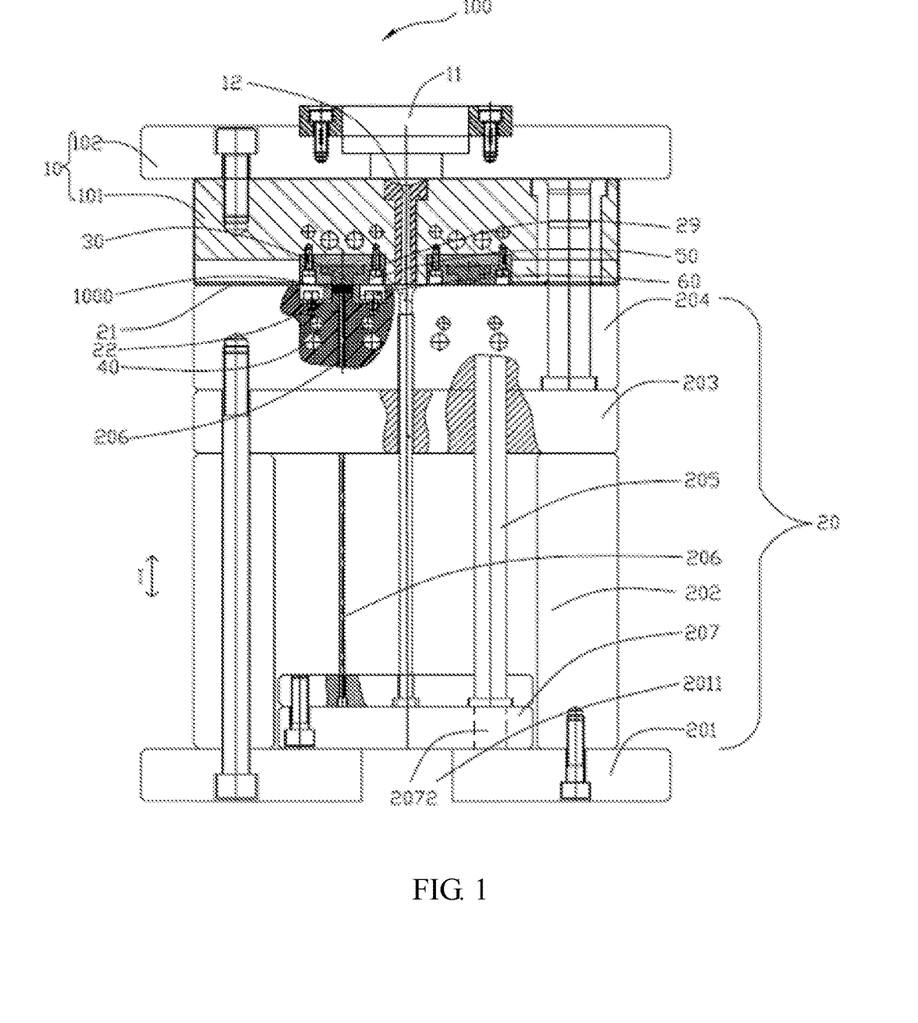
FIG. 1 is a schematic view of a longitudinal section of an injection molding apparatus according to a first embodiment of a first solution of the present disclosure.
Figure 2:
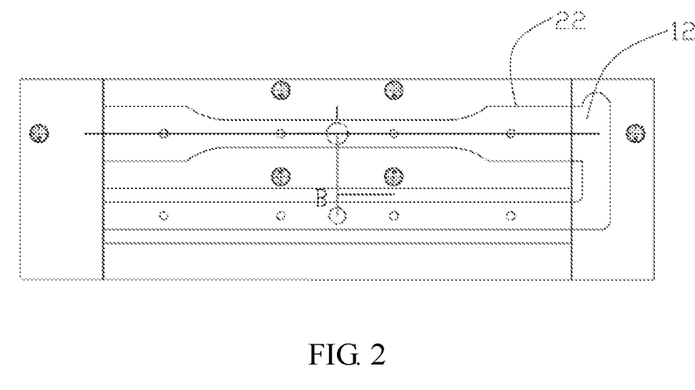
FIG. 2 is a top view of a cross section of the injection molding apparatus according to the first embodiment of the first solution of the present disclosure.

Referring to FIG. 1 and FIG. 2, FIG. 1 and FIG. 2 show an injection molding apparatus 100 provided in a first embodiment of a first solution of the present disclosure. The injection molding apparatus 100 is configured to receive injection-molding melt to solidify the injection-molding melt into an injection molded part 1000. The injection molding apparatus 100 includes a fixed mold component 10, a movable mold component 20, a first positive electrode module 30, and a first negative electrode module 40.

An injection port 11 and a transmission runner 12 connected with the injection port 11 are formed in the fixed mold component 10. The injection port 11 is configured to be connected to a material injection apparatus (not shown), to receive the injection-molding melt injected by the material injection apparatus.

After the material injection apparatus injects the injection-molding melt into the injection port 11, the injection-molding melt flows into the transmission runner 12. The fixed mold component 10 includes a fixed mold module 101 and a fixed-mold fastening board 102. The fixed-mold fastening board 102 is located on the top of the fixed mold module 101, and is configured to fasten the fixed mold module 101.

Optionally, the fixed-mold fastening board 102 may be fastened to the material injection apparatus by using a buckle, a screw, or the like, so as to fasten the fixed mold module 101 to the material injection apparatus.

The movable mold component 20 is configured to cooperate with the fixed mold component 10 to mold the injection molded part 1000. A molding groove 22 is formed on a top portion 21 of the movable mold component 20. The molding groove 22 runs through the top portion 21 of the movable mold component 20, and is connected with the transmission runner 12. The molding groove 22 includes a first side and a second side that are provided opposite to each other.

It should be noted that the molding groove 22 running through the top portion 21 of the movable mold component 20 may be understood as the molding groove 22 having an opening, and the opening is provided on the top portion 21 of the movable mold component 20, so that the molding groove 22 is connected with an external space of the movable mold component 20. The molding groove 22 may be formed by an inward recess from the top portion 21 of the movable mold component 20, or may be formed by excavating inwards from the top portion 21 of the movable mold component 20, or may be formed in another manner. It should be understood that, for the forming manner of the molding groove 22, reference may be made to some existing manners or some new manners in the future, provided that the opening of the molding groove 22 is located on the top portion of the movable mold component 20, so that the molding groove 22 is connected with the external space of the movable mold component 20.

Optionally, the movable mold component 20 may move along a direction I perpendicular to the ground, to cooperate with the fixed mold component 10 to mold the injection molded part 1000.

Optionally, the movable mold component 20 is further connected to a push-pull mechanism (not shown). The push-pull mechanism is configured to push and pull the movable mold component 20, so that the movable mold component 20 moves along the direction I perpendicular to the ground. The movable mold component 20 includes a fixed base 201, a supporting column 202, a movable-mold fastening board 203, a movable mold module 204, a guide piece 205, an abutting rod 206, and a moving board 207. The fixed base 201 is further provided with a through hole 2011. The through hole 2011 runs through the top and the bottom of the fixed base 201. The supporting column 202 is disposed on the fixed base 201, and is configured to support the movable-mold fastening board 203. The movable mold module 204 is fastened on the movable-mold fastening board 203. The moving board 207 is placed on the top of the fixed base 201, and corresponds to the through hole 2011. The moving board 207 is provided with a limiting hole 2072. The guide piece 205 runs through the limiting hole 2072, and is disposed between the movable-mold fastening board 203 and the fixed base 201, to guide the moving board 207. A first end of the abutting rod 206 is fastened on the moving board 207. A second end of the abutting rod 206 corresponds to the molding groove 22. When the injection molding apparatus 100 is needed to mold the injection molded part 1000, the movable mold component 20 is pushed by using the push-pull mechanism to get close to the fixed mold component 10 along the direction I perpendicular to the ground, until the movable mold component 20 is in press fit with the fixed mold component 10. When the injection molded part 1000 needs to be taken out, the movable mold component 20 is driven by using the push-pull mechanism to get away from the fixed mold component 10 along the direction I perpendicular to the ground. Then the push-pull mechanism is used to push the moving board 207, to drive the abutting rod 206 to move, and the abutting rod 206 moves towards the molding groove 22 under guide of the guide piece 205, so as to eject the injection molded part 1000 out of the injection molding groove 22.

The first positive electrode module 30 is located on the first side of the molding groove 22.

The first negative electrode module 40 is located on the second side of the molding groove 22, to correspond to the first positive electrode module 30, so as to cooperate with the first positive electrode module 30 to form an electric field between the first side and the second side of the molding groove 22, and further to perform electric field excitation on the injection-molding melt that flows into the molding groove 22 through the transmission runner 12; and at least one of the first positive electrode module 30 or the first negative electrode module 40 is insulated from the fixed mold component 10 and the movable mold component 20.

In this embodiment, a molding groove 22 is formed on a top portion 21 of the movable mold component 20. The molding groove 22 runs through the top portion 21 of the movable mold component 20, and is connected with the transmission runner 12. The molding groove 22 includes a first side and a second side that are provided opposite to each other. The first positive electrode module 30 is disposed on the first side of the molding groove 22, and is insulated from the fixed mold component 10 and the movable mold component 20. The first negative electrode module 40 is disposed on the second side of the molding groove 22, to correspond to the first positive electrode module 30, so as to cooperate with the first positive electrode module 30 to form an electric field between the first side and the second side of the molding groove 22, and further to perform electric field excitation on the injection-molding melt that flows into the molding groove 22 through a first through groove; and at least one of the first positive electrode module 30 or the first negative electrode module 40 is insulated from the fixed mold component 10 and the movable mold component 20. Therefore, by means of the injection molding apparatus 100, an electric field is formed between the first side and the second side of the molding groove 22, to implement electric field excitation on injection-molding melt flowing into the molding groove 22, thereby forming a final injection molded part 1000. By means of quality analysis for the injection molded part 1000, a structure form and performance of the injection molded part are improved.

It should be noted that for consideration of safety, the first positive electrode module 30 and the first negative electrode module 40 may both be insulated from the fixed mold component 10 and the movable mold component 30.

Optionally, the first positive electrode module 30 is disposed in the fixed mold component 10. The first side of the molding groove 22 is a side that is of the molding groove and that is away from the movable mold component 20 in a direction from the movable mold component 20 to the fixed mold component 10. The first negative electrode module 40 is the movable mold component 20. The second side of the molding groove 22 is a side that is of the molding groove 22 and that is away from the fixed mold component 10 in the direction from the movable mold component 20 to the fixed mold component 10. The movable mold component 20 is grounded, so that a direction of the electric field formed between the first side and the second side of the molding groove 22 is perpendicular to a flowing direction of the injection-molding melt that flows into the molding groove 22. The first positive electrode module 30 may be connected to an external positive electrode.

Optionally, when the movable mold component 20 may move along the direction I perpendicular to the ground, to cooperate with the fixed mold component 10 to mold the injection molded part 1000, the first side of the molding groove 22 is a side that is of the molding groove 22 and that is away from the movable mold component 20 in the direction I perpendicular to the ground. The second side of the molding groove 22 is a side that is of the molding groove 22 and that is away from the fixed mold component 10 in the direction I perpendicular to the ground.

Optionally, the fixed mold component 10 is provided with an accommodation groove 29. The accommodation groove 29 runs through a bottom wall of the fixed mold component 10, and corresponds to the molding groove 22. The injection molding apparatus 100 further includes a first insulation structure 50 and a second insulation structure 60. The first positive electrode module 30 is accommodated in the accommodation groove 29. The first insulation structure 50 is disposed between the first positive electrode module 30 and an inner wall of the accommodation groove 29, so as to insulate the first positive electrode module 30 from the fixed mold component 10. The second insulation structure 60 is disposed in the movable mold component 20, and encircles a peripheral wall of the molding groove 22, so that the peripheral wall of the molding groove 22 is insulated from the movable mold component 20, to centralize electric field lines of the electric field in the molding groove 22.

It should be noted that the accommodation groove 29 running through the bottom wall of the fixed mold component 10 may be understood as the accommodation groove 29 having an opening, and the opening is provided on the bottom wall of the fixed mold component 10, so that the accommodation groove 29 is connected with an external space of the fixed mold component 10. The accommodation groove 29 may be formed by an inward recess from the bottom wall of the fixed mold component 10, or may be formed by excavating inwards from the bottom wall of the fixed mold component 10, or may be formed in another manner. It should be understood that, for the forming manner of the accommodation groove 29, reference may be made to some existing manners or some new manners in the future, provided that the opening of the accommodation groove 29 is located on the bottom wall of the fixed mold component 10, so that the accommodation groove 29 is connected with the external space of the fixed mold component 10.

When the fixed mold component 10 and the movable mold component 20 are in a press fit state, the bottom wall of the fixed mold component 10 is in contact with the top portion 21 of the movable mold component 20. Materials of the fixed mold component 10 and the movable mold component 20 are both electrically conductive materials. When the electric field is formed, electric field lines are diverged after the electric field encounters the electrically conductive material. Therefore, the first insulation structure 50 and the second insulation structure 60 centralize the electric field lines in the molding groove 22 to prevent the electric field lines from being divergent, so that a direction of the formed electric field is perpendicular to a flowing direction of the injection-molding melt that flows into the molding groove 22. Specifically, the first insulation structure 50 and the second insulation structure 60 may be of a polyimide fiberglass cloth insulation structure. In this embodiment, a bottom surface of the first positive electrode module 30 is on a same plane as a bottom wall of the fixed mold component 10. Field strength of the electric field is less than breakdown field strength of air. Specifically, in this implementation manner, the electric field is a strong electric field, and the electric field has a field strength of 10 kV/cm. The injection molded part 1000 has a size of 80 mm*10 mm*4 mm.

In this embodiment, the first positive electrode module 30 is block-shaped. In another embodiment, the first positive electrode module 30 may be of another shape such as a sheet-like shape.

Figure 3:
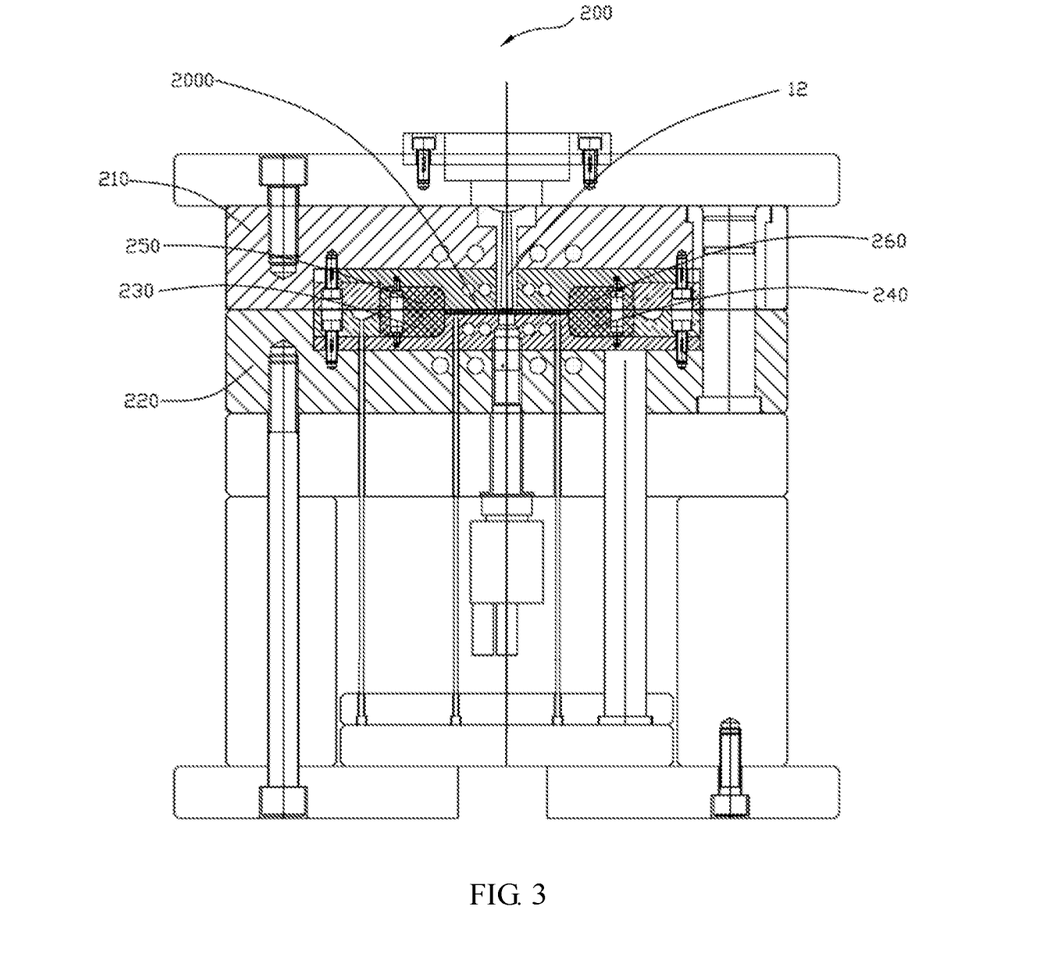
FIG. 3 is a schematic view of a longitudinal section of an injection molding apparatus according to a second embodiment of the first solution of the present disclosure.
Figure 4:
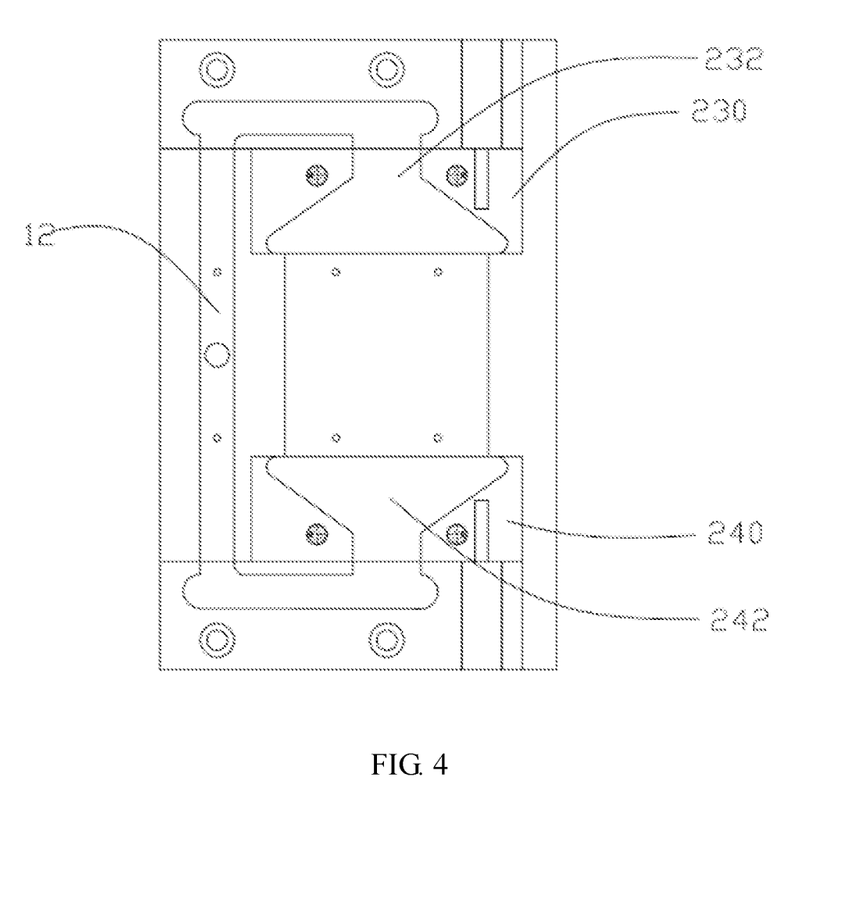
FIG. 4 is a top view of a cross section of the injection molding apparatus according to the second embodiment of the first solution of the present disclosure.

Referring to FIG. 3 and FIG. 4, a second embodiment of the first solution of the present disclosure provides an injection molding apparatus 200. The injection molding apparatus 200 provided in the second embodiment is similar to the injection molding apparatus 100 provided in the first embodiment, and a difference between them is: in the second embodiment, the first positive electrode module 230 and the first negative electrode module 240 are both disposed in the movable mold component 220. The first side of the molding groove 22 is a side from which the injection-molding melt flows into the molding groove 22. The second side of the molding groove 22 is a side from which the injection-molding melt flows out of the molding groove. The first positive electrode module 230 is provided with a first through groove 232, and a first port of the first through groove 232 is connected with the transmission runner 12. A second port of the first through groove 232 is connected with a first port of the molding groove 22, so that the injection-molding melt flows into the molding groove 22 through the transmission runner 12 and the first through groove 232, and a direction of an electric field formed between the first positive electrode module 230 and the first negative electrode module 240 is parallel to a flowing direction of the injection-molding melt that flows into the molding groove 22.

In this embodiment, the electric field is a strong electric field, and the electric field has a field strength of 10 kV/cm. The injection molded part 2000 has a size of 60 mm*60 mm*2 mm. The first positive electrode module 230 and the first negative electrode module 240 are both block-shaped. In another embodiment, the first positive electrode module 230 and/or the first negative electrode module 240 may be of another shape such as a sheet-like shape. The first positive electrode module 230 is configured to be connected to an external positive electrode. The first negative electrode module 240 is configured to be connected to an external negative electrode or grounded.

Further, the first negative electrode module 240 is provided with a second through groove 242. A first port of the second through groove 242 is connected with the transmission runner 12. A second port of the second through groove 242 is connected with a second port of the molding groove 22, so that the injection-molding melt flowing out of the transmission runner 12 flows into the molding groove 22 separately through the first through groove 232 and the second through groove 242, and the injection-molding melt 1000 flowing into the molding groove 22 has a weld line after being molded.

It should be noted that the weld line is a cross-connection surface formed when the two flows of injection-molding melt originally encounter each other. Because a quality defect in an injection molding process is generally formed when the injection-molding melt is filled into the molding groove, the formation of the weld line and impact of the weld line on overall performance of the injection molded part are widely concerned problems, and an injection molded part molded by using existing injection molding equipment cannot analyze impact of an electric field on a weld line. By means of the injection molding apparatus 100 in the present disclosure, an electric field is formed between the first side and the second side of the molding groove 22, and the melt flowing out of the transmission runner 12 flows into the molding groove 22 separately through the first through groove 232 and the second through groove 242, so that the injection-molding melt 1000 flowing into the molding groove 22 has a weld line after being molded. Therefore, the impact of the electric field on the weld line may be analyzed, so as to improve the overall performance of the injection molded part.

Optionally, the first through groove 232 and the second through groove 242 are fan-shaped. A neck, with a minimum aperture, of the first through groove 232 is an inlet of the first through groove 232, and a neck, with a minimum aperture, of the second through hole 242 is an inlet of the second through hole 242, so that the injection-molding melt separately flows into the first through groove 232 and the second through hole 242. A neck, with a maximum aperture, of the first through groove 232 and the second through hole 242 is an outlet of the first through groove, to guide the injection-molding melt from the first through groove 232 and the second through hole 242 to the molding groove 22.

In this embodiment, cross-sections of the first through groove 232 and the second through hole 242 are fan-shaped, so that a flow field of the injection-molding melt is uniform, to improve quality of the injection molded part. In another embodiment, the first through groove 232 and the second through hole 242 may be set to another shape according to an actual requirement.

Optionally, a fuel pipe is further disposed in the fixed mold component 10, and is configured to generate heat, so as to transfer the heat to the molding groove 22, to mold the injection-molding melt in the molding groove 22. A water pipe is further disposed in the movable mold component 20, and is configured to perform cooling and molding on the injection-molding melt in the molding groove 22. Further, the injection molding apparatus 100 further includes a thermally conductive pad (not shown). The thermally conductive pad is disposed at the bottom of the first positive electrode module 30, to transfer the heat generated by the fuel pipe to the injection-molding melt.

Optionally, the injection molding apparatus 200 further includes a second positive electrode module 250 and a second negative electrode module 260. The second positive electrode module 250 is disposed in the fixed mold component 210, and is located above the first positive electrode module 230, so as to form a positive electrode module group with the first positive electrode module 210. The second negative electrode module 260 is disposed in the fixed mold component 210, and is located above the first negative electrode module 240, so as to form a negative electrode module group with the first negative electrode module 240. The second positive electrode module and the second negative electrode module are both insulated from the fixed mold component 210. The positive electrode module group cooperates with the negative electrode module group, to form an electric field between the first side and the second side of the molding groove 22, and further to perform electric field excitation on the injection-molding melt flowing into the molding groove 22.

It should be noted that the first positive electrode module 230 and the first negative electrode module 240 are both disposed in the movable mold component 220. The second positive electrode module 250 is disposed in the fixed mold component 210, and is disposed corresponding to the first positive electrode module 230. The second negative electrode module 260 is disposed in the fixed mold component 210, and is disposed corresponding to the first positive electrode module 240. This arrangement of the first positive electrode module 230, the first negative electrode module 240, the second positive electrode module 250, and the second negative electrode module 260 ensures uniformity of the electric field.

In this embodiment, the second positive electrode module 250 and the second negative electrode module 260 are both block-shaped. In another embodiment, the second positive electrode module 250 and/or the second negative electrode module 260 may be of another shape such as a sheet-like shape. The second positive electrode module 250 is configured to be connected to an external positive electrode. The second negative electrode module 260 is configured to be connected to an external negative electrode or grounded.

Optionally, the second positive electrode module 250 is provided with a third through groove (not shown). A first port of the third through groove is connected with the transmission runner 12. A second port of the third through groove is connected with a first port of the molding groove 22, and the third through groove is connected with the first through groove 232. The negative electrode module 260 is provided with a fourth through groove (not shown). A first port of the fourth through groove is connected with the transmission runner 12. A second port of the fourth through groove is connected with a second end of the molding groove 22, and the fourth through groove is connected with the second through groove 242.

Optionally, the third through groove and the fourth through groove are funnel-shaped. A neck, with a minimum aperture, of the third through groove is an inlet of the third through groove, and a neck, with a minimum aperture, of the fourth through groove is an inlet of the fourth through groove, so that the injection-molding melt separately flows into the third through groove and the fourth through groove. A neck, with a maximum aperture, of the third through groove is an outlet of the third through groove, and a neck, with a maximum aperture, of the fourth through groove is an outlet of the fourth through groove, so as to guide the injection-molding melt from the third through groove and the fourth through groove to the third through groove 22.

Similarly, cross-sections of the third through groove and the fourth through hole are fan-shaped, so that the flow field of the injection-molding melt is uniform, to improve the quality of the injection molded part. In another embodiment, the first through groove 232 and the second through hole 242 may be set to another shape according to an actual requirement.

Optionally, a shape of the first positive electrode module 230 is the same as that of the second positive electrode module 250, and a shape of the first negative electrode module 240 is the same as that of the second negative electrode module 260. A projection of the first positive electrode module 230 on the ground overlaps that of the second positive electrode module 250 on the ground. A projection of the first negative electrode module 240 on the ground overlaps that of the second negative electrode module 260 on the ground, so that the electric field is more uniform.

Further, the shapes of the first positive electrode module 230 and the second positive electrode module 250 are the same as those of the first negative electrode module 240 and the second negative electrode module 260.

In this embodiment, a molding groove is formed on the top portion of the movable mold component; the molding groove runs through the top portion of the movable mold component, and is connected with the transmission runner. The first positive electrode module is located on the first side of the molding groove, and is insulated from the fixed mold component and the movable mold component. Injection-molding melt is injected by using the injection port, so that the injection-molding melt flows into the molding groove through the transmission runner. An electric field between the first side and the second side of the molding groove performs electric field excitation on the injection-molding melt flowing into the molding groove. Therefore, with the injection molding apparatus, an electric field is formed between the first side and the second side of the molding groove, to implement electric field excitation on injection-molding melt flowing into the molding groove, thereby forming a final injection molded part 1000. By means of quality analysis for the injection molded part 1000, a structure form and performance of the injection molded part are improved.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that the descriptions are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An injection molding apparatus, configured to receive injection-molding melt to solidify the injection-molding melt into an injection molded part, wherein the injection molding apparatus comprises:
   a fixed mold component, wherein an injection port and a transmission runner connected with the injection port are formed in the fixed mold component, and the injection port is configured to be connected to a material injection apparatus, to receive the injection-molding melt injected by the material injection apparatus;
   a movable mold component, wherein the movable mold component cooperates with the fixed mold component to mold the injection molded part, a molding groove is formed on a top portion of the movable mold component, the molding groove runs through the top portion of the movable mold component, and is connected with the transmission runner, and the molding groove comprises a first side and a second side that are provided opposite to each other;
   a first positive electrode component, wherein the first positive electrode component is located on the first side of the molding groove; and
   a first negative electrode component, wherein the first negative electrode component is located on the second side of the molding groove, to correspond to the first positive electrode component, so as to cooperate with the first positive electrode component to form an electric field between the first side and the second side of the molding groove, and further to perform electric field excitation on the injection-molding melt that flows into the molding groove through the transmission runner, wherein at least one of the first positive electrode component or the first negative electrode component is insulated from the fixed mold component and the movable mold component,
   wherein:
   the first positive electrode component is disposed in the fixed mold component,
   the first negative electrode component is disposed in the movable mold component,
   a direction of the electric field formed between the first side and the second side of the molding groove is perpendicular to a flowing direction of the injection-molding melt that flows into the molding groove,
   the first side of the molding groove is a side that is of the molding groove and that is away from the movable mold component in a direction from the movable mold component to the fixed mold component,
   the second side of the molding groove is a side that is of the molding groove and that is away from the fixed mold component in the direction from the movable mold component to the fixed mold component, wherein the movable mold component is grounded,
   the fixed mold component is provided with an accommodation groove, wherein the accommodation groove runs through a bottom wall of the fixed mold component, and corresponds to the molding groove, the injection molding apparatus further comprises a first insulation structure and a second insulation structure, the first positive electrode component is accommodated in the accommodation groove, the first insulation structure is disposed between the first positive electrode component and an inner wall of the accommodation groove to insulate the first positive electrode component from the fixed mold component, and the second insulation structure is disposed in the movable mold component and encircles a peripheral wall of the molding groove so that the peripheral wall of the molding groove is insulated from the movable mold component to centralize electric field lines of the electric field in the molding groove.

2. The injection molding apparatus according to claim 1, wherein a bottom surface of the first positive electrode component is on a same plane as the bottom wall of the fixed mold component.

3. An injection molding apparatus, configured to receive injection-molding melt to solidify the injection-molding melt into an injection molded part, wherein the injection molding apparatus comprises:

a fixed mold component, wherein an injection port and a transmission runner connected with the injection port are formed in the fixed mold component, and the injection port is configured to be connected to a material injection apparatus, to receive the injection-molding melt injected by the material injection apparatus;

a movable mold component, wherein the movable mold component cooperates with the fixed mold component to mold the injection molded part, a molding groove is formed on a top portion of the movable mold component, the molding groove runs through the top portion of the movable mold component, and is connected with the transmission runner, and the molding groove comprises a first side and a second side that are provided opposite to each other;

a first positive electrode component, wherein the first positive electrode component is located on the first side of the molding groove; and a first negative electrode component, wherein the first negative electrode component is located on the second side of the molding groove, to correspond to the first positive electrode component, so as to cooperate with the first positive electrode component to form an electric field between the first side and the second side of the molding groove, and further to perform electric field excitation on the injection-molding melt that flows into the molding groove through the transmission runner, wherein at least one of the first positive electrode component or the first negative electrode component is insulated from the fixed mold component and the movable mold component, wherein:

the first positive electrode component and the first negative electrode component are both disposed in the movable mold component, the first positive electrode component is provided with a first through groove, wherein a first port of the first through groove is connected with the transmission runner, and a second port of the first through groove is connected with a first port of the molding groove, so that the injection-molding melt flows into the molding groove through the transmission runner and the first through groove, the first negative electrode component is provided with a second through groove, wherein a first port of the second through groove is connected with the transmission runner, and a second port of the second through groove is connected with a second port of the molding groove, so that the injection-molding melt flowing out of the transmission runner flows into the molding groove separately through the first through groove and the second through groove, and a direction of an electric field formed between the first positive electrode component and the first negative electrode component is parallel to a flowing direction of the injection-molding melt that flows into the molding groove.

4. The injection molding apparatus according to claim 3, wherein:

the injection-molding melt flowing into the molding groove has a weld line after being molded.

5. The injection molding apparatus according to claim 3, wherein:

the injection molding apparatus further comprises a second positive electrode component and a second negative electrode component, wherein the second positive electrode component is disposed in the fixed mold component, and is located proximate the first positive electrode component, to form a positive electrode component group with the first positive electrode component, and wherein the second negative electrode component is disposed in the fixed mold component, and is located proximate the first negative electrode component, to form a negative electrode component group with the first negative electrode component, wherein the second positive electrode component and the second negative electrode component are both insulated from the fixed mold component, and the positive electrode component group cooperates with the negative electrode component group, to form an electric field between the first side and the second side of the molding groove, and further to perform electric field excitation on the injection-molding melt flowing into the molding groove.

6. The injection molding apparatus according to claim 5, wherein:

the second positive electrode component is provided with a third through groove, wherein a first port of the third through groove is connected with the transmission runner, a second port of the third through groove is connected with the first port of the molding groove, and the third through groove is connected with the first through groove; and the second negative electrode component is provided with a fourth through groove, wherein a first port of the fourth through groove is connected with the transmission runner, a second port of the fourth through groove is connected with the second end of the molding groove, and the fourth through groove is connected with the second through groove.

7. The injection molding apparatus according to claim 5, wherein:

a shape of the first positive electrode component is the same as a shape of the second positive electrode component, a shape of the first negative electrode component is the same as a shape of the second negative electrode component, a projection of the first positive electrode component overlaps a projection of the second positive electrode component, and a projection of the first negative electrode component overlaps a projection of the second negative electrode component.

8. The injection molding apparatus according to claim 3, wherein:

an inlet of the first through groove forms a neck having a first aperture size, so that the injection-molding melt flows into the first through groove from the transmission runner through the neck; and an outlet of the first through groove forms a neck having a second aperture size, greater than the first aperture size, to guide the injection-molding melt to the molding groove from the first through groove.

9. An injection molding apparatus, configured to receive injection-molding melt to solidify the injection-molding melt into an injection molded part, wherein the injection molding apparatus comprises:

a fixed mold component, wherein an injection port and a transmission runner connected with the injection port are formed in the fixed mold component, and the injection port is configured to be connected to a material injection apparatus, to receive the injection-molding melt injected by the material injection apparatus;

a movable mold component, wherein the movable mold component cooperates with the fixed mold component to mold the injection molded part, a molding groove is formed on a top portion of the movable mold component, the molding groove runs through the top portion of the movable mold component, and is connected with the transmission runner, and the molding groove comprises a first side and a second side that are provided opposite to each other;

a first positive electrode component, wherein the first positive electrode component is located on the first side of the molding groove; and a first negative electrode component, wherein the first negative electrode component is located on the second side of the molding groove, to correspond to the first positive electrode component, so as to cooperate with the first positive electrode component to form an electric field between the first side and the second side of the molding groove, and further to perform electric field excitation on the injection-molding melt that flows into the molding groove through the transmission runner, wherein at least one of the first positive electrode component or the first negative electrode component is insulated from the fixed mold component and the movable mold component, wherein:

the first positive electrode component and the first negative electrode component are both disposed in the movable mold component, the first side of the molding groove is a side from which the injection-molding melt flows into the molding groove, the second side of the molding groove is a side from which the injection-molding melt flows out of the molding groove, the first positive electrode component is provided with a first through groove, wherein a first port of the first through groove is connected with the transmission runner, and a second port of the first through groove is connected with a first port of the molding groove, so that the injection-molding melt flows into the molding groove through the transmission runner and the first through groove, a direction of an electric field formed between the first positive electrode component and the first negative electrode component is parallel to a flowing direction of the injection-molding melt that flows into the molding groove, an inlet of the first through groove forms a neck having a first aperture size, so that the injection-molding melt flows into the first through groove from the transmission runner through the neck, and an outlet of the first through groove forms a neck having a second aperture size, greater than the first aperture size, to guide the injection-molding melt to the molding groove from the first through groove.

* * * * *